(12) United States Patent
Hagmann et al.

(10) Patent No.: US 6,994,386 B2
(45) Date of Patent: Feb. 7, 2006

(54) GRIPPER

(75) Inventors: Peter Hagmann, Erlenbach am Main (DE); Günter Lässig, Obernburg (DE); Roger Biel, Aschaffenburg (DE)

(73) Assignee: Novartis AG, Basel (CH)

( * ) Notice: Subject to any disclaimer, the term of this patent is extended or adjusted under 35 U.S.C. 154(b) by 18 days.

(21) Appl. No.: 10/386,951

(22) Filed: Mar. 12, 2003

(65) Prior Publication Data

US 2003/0178862 A1    Sep. 25, 2003

(30) Foreign Application Priority Data

Mar. 21, 2002    (EP) .................................. 02006341

(51) Int. Cl.
    *B25J 15/06*    (2006.01)

(52) U.S. Cl. ........................ 294/64.1; 901/40
(58) Field of Classification Search ................ 294/1.2, 294/64.1, 64.2, 64.3, 902; 901/40; 269/21

See application file for complete search history.

(56) References Cited

U.S. PATENT DOCUMENTS

| | | | | |
|---|---|---|---|---|
| 3,134,208 A | * | 5/1964 | Richmond | 51/235 |
| 3,879,076 A | * | 4/1975 | Barnett | 294/1.2 |
| 5,969,793 A | | 10/1999 | Dobner | 351/247 |
| 6,032,997 A | * | 3/2000 | Elliott et al. | 294/64.1 |
| 6,254,155 B1 | * | 7/2001 | Kassir | 294/64.1 |
| 6,279,976 B1 | * | 8/2001 | Ball | 294/64.1 |
| 6,398,277 B1 | * | 6/2002 | McDonald | 294/1.2 |
| 6,494,021 B1 | * | 12/2002 | Schlagel et al. | 53/432 |
| 6,502,876 B1 | | 1/2003 | Stockhorst et al. | 294/64.1 |

* cited by examiner

*Primary Examiner*—Dean J. Kramer
(74) *Attorney, Agent, or Firm*—Karen Borrelli

(57) ABSTRACT

A gripper (1) for contact lenses comprises a gripper head (10) which has a bearing surface (100) for a contact lens (CL) and in which one or more openings (101, 102) are provided through which an underpressure can be applied in order to suck the contact lens (CL) against the bearing surface (100), and through which an overpressure can be applied in order to release the contact lens (CL) from the bearing surface (100). Channels (103) are provided in the bearing surface (100) and connect a plurality of openings (101, 102) to one another.

11 Claims, 3 Drawing Sheets

GRIPPER

Figure 1:
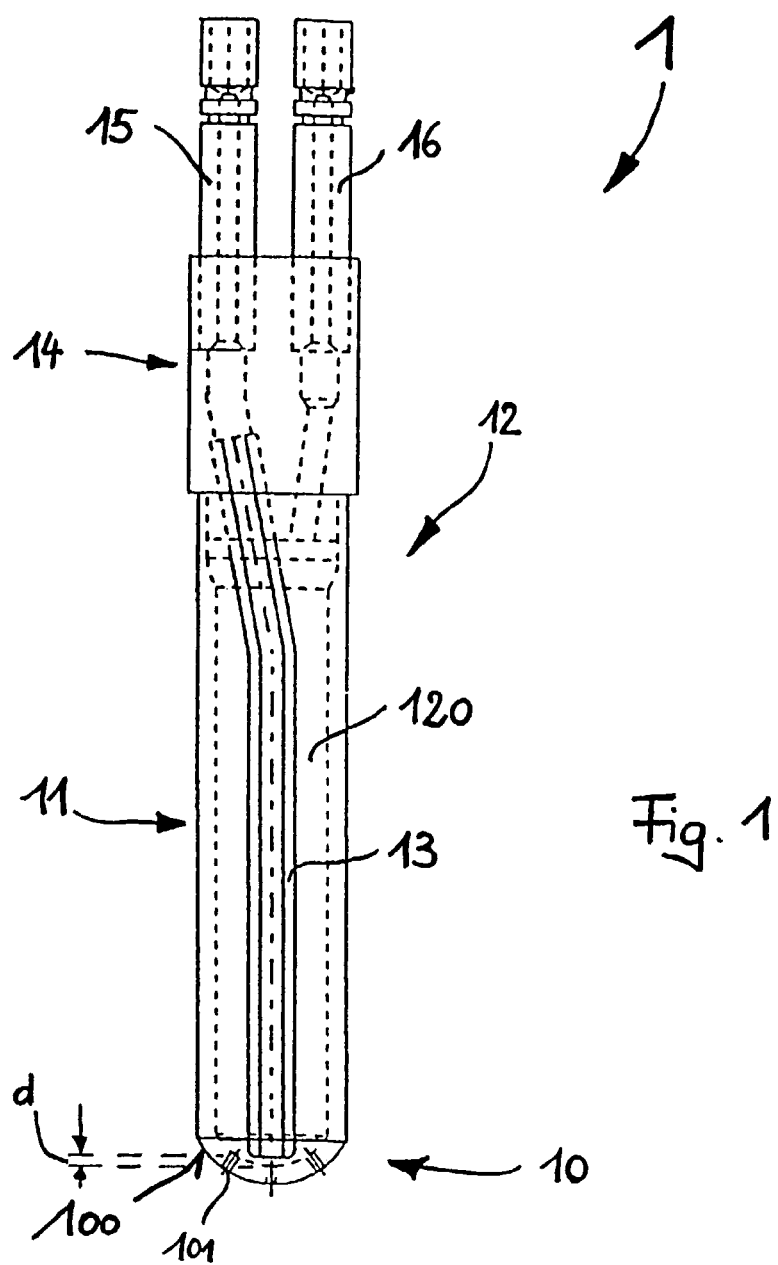

This application claims benefit under 35 USC § 119 of European patent application No. EP 02006341.8 filed Mar. 21, 2002, the contents of which are incorporated herein by reference.

The invention relates to a gripper according to the preamble of the independent patent claim.

In the automated production of contact lenses in general, but especially in the production of large batches of contact lenses, as is the case for example with disposable lenses, it is necessary, at certain stations in the production process, to be able to manipulate the contact lenses safely, quickly and efficiently. An example of such manipulation of a contact lens is when the contact lens is removed from a test cell in which said contact lens has been placed in a liquid, for example in water, in order to test it (e.g. by image processing).

To remove the tested contact lens from such a test cell, devices called grippers are used, as are also used at other stations in such a production process. The contact lens is gripped with the aid of such a gripper and, in the example described above, is removed from the test cell. The contact lens is then deposited for example into a receptacle which can be part of the final package for the contact lens and into which a storage solution (e.g. saline) is dispensed. The receptacle is then welded or sealed with a cover foil, and, after subsequent autoclaving, the final package can be released for distribution.

In the above-described removal of the contact lens from the test cell and the subsequent dispensing of the contact lens into the receptacle in which the saline is present, care must be taken to ensure that only a very small amount of water, preferably none at all, is entrained with the contact lens. This is a problem which is not at all easy to solve, because the contact lens in the abovementioned test cell has to be sucked from "under water" (with the result that water is necessarily also sucked out with the lens), then transported to the receptacle which is part of the final package, and finally deposited in this receptacle, for which purpose the contact lens has to be released again from the gripper. In addition, the contact lens has to be gripped securely by the gripper (even "under water"), and in the case of small receptacles the contact lens has to be reliably deposited centrally in the receptacle so that it is not later damaged by the cover foil during the welding or sealing of the receptacle.

The object of the present invention is to make available a gripper which is able to satisfy the abovementioned requirements, in other words one which, on the one hand, reliably grips a contact lens, if appropriate even "under water", and in such a case ensures that the amount of liquid (e.g. water) entrained is very small (e.g. less than approximately 40 microlitres). On the other hand, the contact lens must be able to be reliably deposited centrally in a receptacle, for which purpose it must be possible to achieve a highly controlled release of the contact lens from the gripper.

This object is achieved by a gripper according to the invention, as characterized by the features of the independent patent claim. Particularly advantageous embodiments of the gripper according to the invention will become evident from the features of the dependent patent claims.

In particular, the gripper according to the invention comprises a gripper head which has a bearing surface for a contact lens and in which one or more openings are provided through which an underpressure can be applied in order to suck the contact lens against the bearing surface, and through which an overpressure can be applied in order to release the contact lens from the bearing surface. Channels are provided in the gripper head which connect a plurality of openings to one another. By connecting a plurality of openings (possibly even all the openings) with the aid of channels provided in the gripper head, it is possible on the one hand, upon application of underpressure, to reliably suck the contact lens against the bearing surface of the gripper head, because the contact lens is sucked against the bearing surface at several positions simultaneously, and, on the other hand, it is possible, for the same reason, to ensure that, upon application of overpressure, the contact lens can be deposited safely and in a deliberate manner into a receptacle, e.g. centrally into a receptacle which forms part of a final package, as has already been described in the introduction.

The channels can for example in this case be designed as (relatively narrow and fairly shallow) grooves. It is therefore possible to simultaneously apply underpressure or overpressure either through a plurality of the openings present or even through all the openings present and thereby to suck the contact lens against the bearing surface, or release it from the bearing surface, via all the openings simultaneously.

If, as has been described above, the contact lens is for example situated in a test cell in which there is a liquid (e.g. water), the contact lens is sucked from "under water" in the gripping operation, and it can happen that liquid gets in between the rear face of the contact lens and the bearing surface of the gripper head. Such trapped liquid can now be sucked through the channels, with the contact lens lying against the bearing surface of the gripper head, as a result of which the amount of water entrained can be kept very small.

A design of the gripper is advantageous in which the openings are arranged on an arc of a circle, and an opening is also arranged at the centre of the arc of the circle. In this design of the gripper, the contact lens can be sucked particularly reliably against the bearing surface of the gripper head, and a likewise reliable and deliberate release of the contact lens is also made possible. For this purpose, a separate channel can be provided starting from the opening at the centre of the arc of the circle and extending to each opening arranged on the arc of the circle (as it were in a star shape), said channel connecting the opening at the centre to the respective opening on the arc of the circle.

Furthermore, it can be advantageous if the respective channel, which connects the opening at the centre of the arc of the circle to the respective opening on the arc of the circle, extends radially outwards beyond the opening on the arc of the circle. This ensures that, upon application of underpressure, air can always be reliably sucked in and, as a result, liquid can always be carried off, by which means the amount of water entrained can be kept very small.

It is particularly advantageous if the channels connecting the openings to one another are provided in the bearing surface (against which a contact lens rests after being sucked up) because any liquid caught between the contact lens and the bearing surface can then be sucked off particularly easily.

To ensure the least possible entrainment of liquid, the outer face of the gripper in a further advantageous embodiment is smooth and in particular has no depressions in which liquid can collect.

In a further advantageous embodiment, the gripper according to the invention has an underpressure channel leading to the openings in the gripper head and has an overpressure channel likewise leading to the openings in the gripper head, said overpressure channel and said underpressure channel being essentially separate from one another.

The essentially separate provision of an underpressure channel and of an overpressure channel makes it possible to apply only overpressure or to apply only underpressure, or even both. When depositing the contact lens, there may in fact, for example, still be water present in the interior of the gripper head, which water should be sucked off before the contact lens is deposited. To ensure that this water is not entrained into the receptacle in which the contact lens is deposited, both overpressure and underpressure can be applied for a short period of time, in which case the overpressure ensures that the water situated in the interior of the gripper head and still not sucked away is driven into the underpressure channel, so that, after this water has been sucked off, the contact lens can be released in a deliberate manner and smoothly from the bearing surface, and entrainment of this water is avoided.

To this end, an embodiment of the gripper according to the invention can be advantageous in which the underpressure channel is formed by a tube which extends through the interior of the gripper forming the overpressure channel, and which ends at a short distance from the openings in the gripper head. The tube forming the underpressure channel can in this case end at a distance of 0.1 mm to 5 mm, preferably at a distance of approximately 1 mm, from the openings in the gripper head.

The invention further relates to a grip device for contact lenses, with a gripper which has been described in one of the preceding embodiments, and with a nozzle ring which on its inner wall is provided with nozzles through which a gaseous medium, e.g. air, can be applied. The gripper and nozzle ring are designed such that the gripper can be moved through the nozzle ring towards a contact lens which is to be gripped and, after the contact lens has been gripped, can be moved back together with the contact lens through the nozzle ring again. As the gripper is moved back through the nozzle ring, the contact lens can be acted upon by the gaseous medium so that liquid (e.g. water) which is attached to the outside of the contact lens can be blown off (if, for example, the nozzle ring is arranged over the above-described test cell, the blown-off liquid can even be caught again by the test cell) and the entrainment of liquid can thus be further reduced.

Further advantageous configurations will become evident from the following description of an illustrative embodiment of the invention with reference to the drawing which shows diagrammatic representations and/or cross sections.

Figure 2:
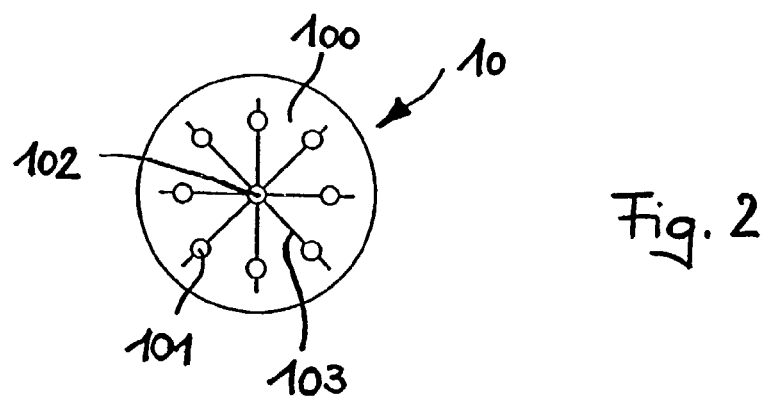
Figure 3:
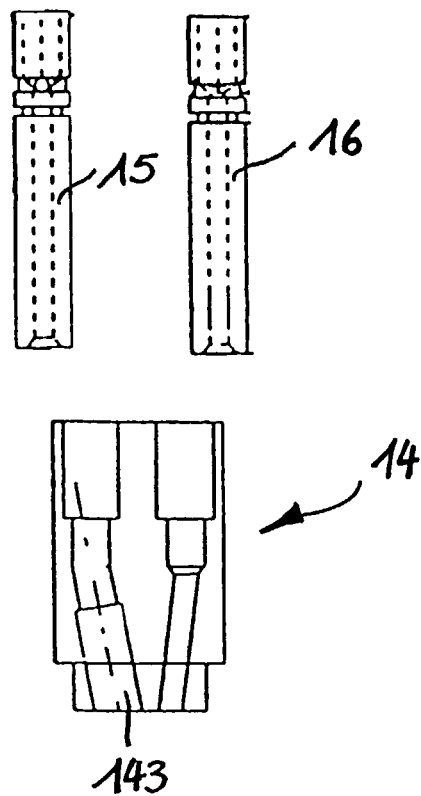
Figure 3:
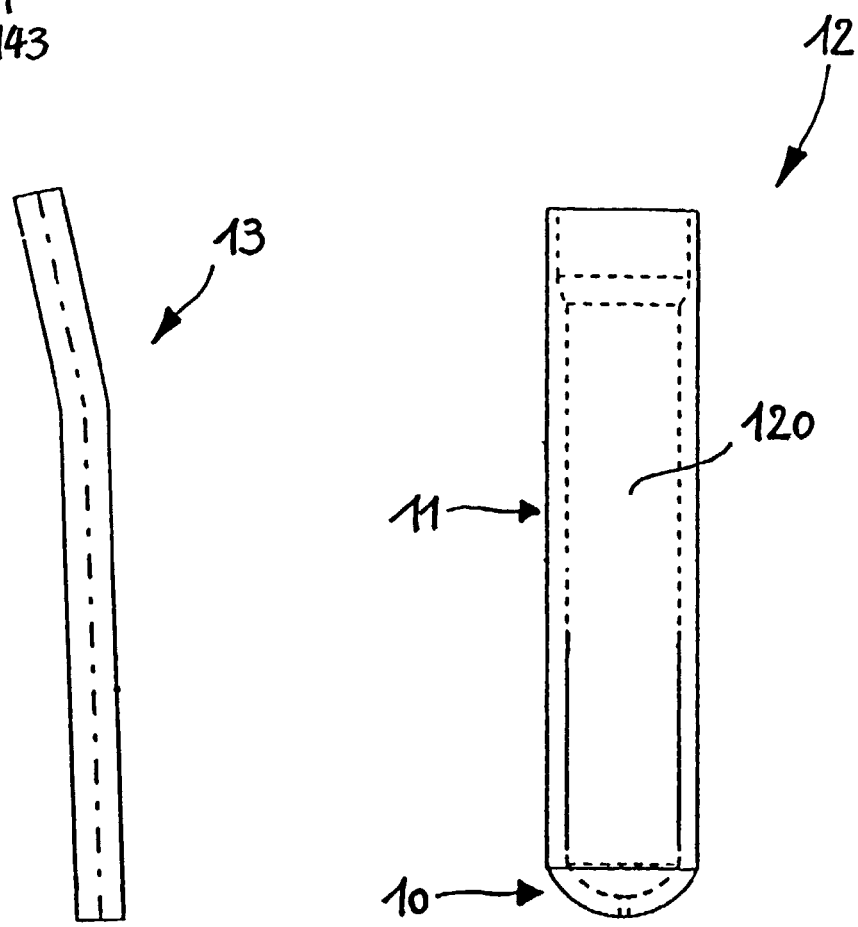
Figure 5:
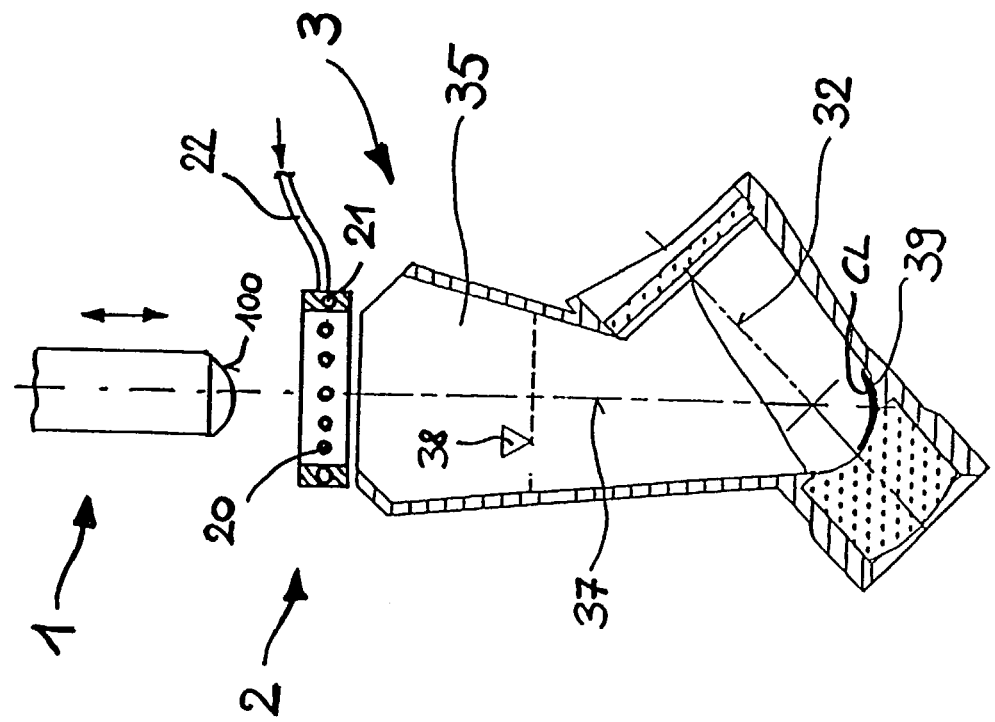
Figure 4:
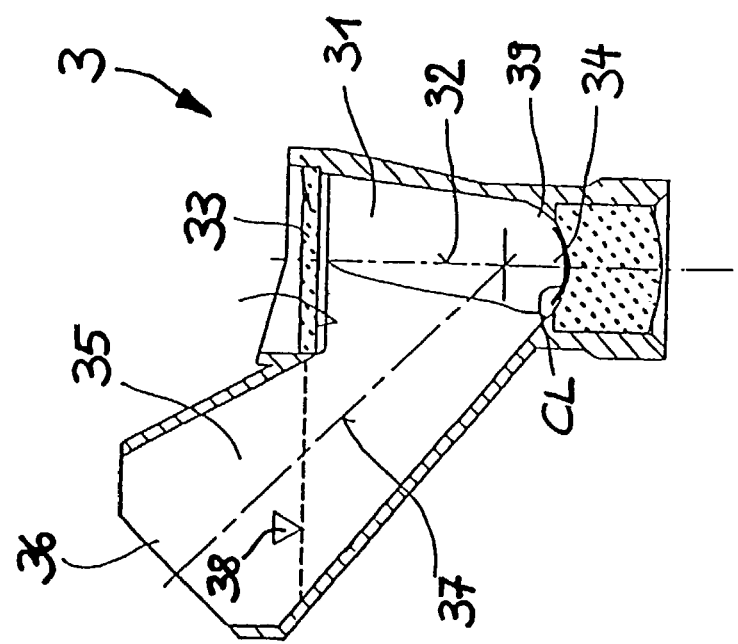

FIG. 1 shows a view of an illustrative embodiment of a gripper according to the invention, FIG. 2 shows a view of the bearing surface of the gripper from FIG. 1, FIG. 3 shows a view of the individual parts of the gripper from FIG. 1, FIG. 4 shows a test cell in a first position, in which a contact lens present in the test cell is tested, and FIG. 5 shows the test cell from FIG. 4 in a second position, in which the contact lens can be removed from the test cell with the aid of the gripper according to the invention, said gripper being guided through a nozzle ring which, together with the gripper, forms a grip device.

The illustrative embodiment of a gripper 1 according to the invention, explained below with reference to FIGS. 1–3, has a gripper head 10 with a bearing surface 100. A plurality of openings 101 are provided in the gripper head 10, as can best be seen from FIG. 2. In the illustrative embodiment shown here, the openings 101 are arranged on an arc of a circle, and an opening 102 is also arranged at the centre of the arc of the circle. A separate channel 103 is provided starting from the opening 102 at the centre of the arc of the circle and extending to each opening 101 on the arc of the circle (as it were in a star shape), which channel 103 connects the opening 102 at the centre to the respective opening 101 on the arc of the circle. The channels 103 are designed as grooves in the bearing surface 100, which are open at one side and extend radially outwards beyond the respective opening 101 on the arc of the circle. Openings 101 could for example also be connected to one another via a channel in the shape of an arc of a circle, but in the illustrative embodiment they are not shown.

Adjoining the gripper head 10, the gripper 1 has a cylindrical part 11 which is formed integrally with the gripper head 10 and as a whole forms a part 12 which can be made for example of a plastic such as POM (polyoxymethylene). The gripper 1 as a whole, but in particular the part 12, has a smooth surface without depressions in which liquid could gather and could then be entrained.

Extending through the interior 120 of the part 12 there is a tube 13 which can function as an underpressure channel and ends at a short distance d from the openings 101 and from the opening 102 at the centre. This distance d can be in the range of approximately 0.1 mm to approximately 5 mm and is preferably approximately 1 mm. The interior 120 itself can form an overpressure channel, as will be explained in more detail below in the description of how the illustrative embodiment of the gripper 1 according to the invention functions. The overpressure channel and the underpressure channel are thus separate from one another, and only at the end of the tube 13 in immediate proximity to the openings 101, 102 can this be otherwise.

Adjoining the cylindrical part 12 of the gripper 1 there is an adapter piece 14 which can be connected to the part 12 and which has receiving bores 143 for the tube 13 and for corresponding attachment pieces 15 and 16 for the supply (not shown) of underpressure and overpressure. Whereas the attachment pieces 15 and 16, the adapter piece 14 and the part 12 with the cylindrical part 11 and with the gripper head 10 are shown as individual parts in FIG. 3, the gripper 1 in FIG. 1 is shown in its assembled state. From FIG. 3 it can be seen that all of the individual parts are easily produced lathed parts, so that the outlay required to produce the individual parts is relatively small, which fact would appear to constitute a further particular advantage of the gripper 1 according to the invention.

In order now to explain the manner in which the gripper 1 functions, reference is made to the example mentioned at the outset, namely that of removing a contact lens CL from a test cell 3, and this will be explained in detail below with reference to FIG. 4 and FIG. 5. The test cell 3 is here designed in such a way that it has a hollow space 31 which extends along a first axis 32, which, in the test position shown in FIG. 4, coincides with the optical axis of an inspection system (not shown here). The hollow space 31 is delimited from above by a viewing glass 33. The lower area of the hollow space 31 is designed as a test trough 34 in which the contact lens CL according to FIG. 4 is received in the test position. The test cell 3 is filled with a liquid, e.g. water, the level 38 of the liquid in the test position lying above the viewing glass 33 so that no free interface of the liquid can interfere with the image and so that no air bubbles are present between liquid and viewing glass 33.

Opening into the hollow space 31 there is an insertion channel 35 which has an outer opening 36 through which the contact lens CL can be inserted into the hollow space 31, for example by means of the gripper 1 according to the invention. The insertion channel 35 extends in a substantially rectilinear manner along a second axis 37 which is at an angle of approximately 45° to the first axis 32 of the hollow space 31. Rectilinear is here intended to signify that a gripper 1 moving in a linear manner can pass through the insertion channel 35 into the hollow space 31 in order to deposit or remove a contact lens CL.

As can be seen from a comparison of FIG. 4 and FIG. 5, the test cell 3 shown can be swivelled between a test position (FIG. 4) and a removal position (FIG. 5). In the removal position of the test cell 3 shown in FIG. 5, the axis 37 of the insertion channel 35 runs vertically, so that the contact lens CL can be removed from above with the aid of the gripper 1 according to the invention.

For this purpose, the gripper 1 is moved through a nozzle ring 2, whose function will be explained further below, and toward the contact lens CL which is located in a removal trough 39 when the test cell 3 is in the removal position (FIG. 5). Once the gripper 1 has reached the contact lens CL, an underpressure is applied and the contact lens CL is sucked against the bearing surface 100 of the gripper head 10. To suck the contact lens CL, underpressure is applied via the tube 13 through all the openings 101 and 102, resulting in the contact lens CL being sucked up in a uniform and reliable manner. During this sucking, it can of course happen that liquid, in this case water, is also sucked up.

The underpressure remains applied and the gripper 1, together with the contact lens CL which has been sucked onto the bearing surface 100, is again moved upwards out of the insertion channel 35. In doing so, the gripper 1, together with the contact lens CL sucked onto the bearing surface 100, is moved through the nozzle ring 2 which here has nozzles 20 which face inwards from its inner wall and which are fed with a gaseous medium through a supply channel 21 provided in the nozzle ring 2. The nozzle ring 2 is provided with a blowing-air delivery means 22 through which blowing air (or another gaseous medium) is fed to the supply channel 21 and is then blown through the nozzles 20.

When the gripper 1, together with the contact lens CL sucked onto the bearing surface 100, passes through the nozzle ring 2, liquid attached to the outside of the contact lens CL is blown off from the contact lens CL with the aid of the blowing air emerging from the nozzles 20. In the illustrated arrangement of the nozzle ring 2 directly above the test cell 3, the blown-off liquid can be caught by the test cell 3. This particular arrangement of the nozzle ring 2 is advantageous, but it is not obligatory, because, in the case of a minor entrainment of liquid (in this case water), it is not imperative that the liquid blown off from the contact lens CL is caught by the test cell 3.

If water is trapped between the contact lens CL and the bearing surface 100 of the gripper head 10 (as can quite easily happen when the contact lens is sucked onto the surface), this water, with the contact lens CL sucked onto the surface, can pass through the channels 103 (grooves) in the bearing surface 100 to the openings 101 and 102 and from there into the interior 120. As long as underpressure is applied, the liquid is gradually sucked off through the tube 13. The distance d of the end of the tube 13 from the openings is therefore chosen so that the liquid which passes through the openings 101 and 102 into the interior 120 can be effectively sucked off from there.

After the contact lens CL has been removed from the test cell 3, the gripper 1, together with said contact lens CL sucked onto the bearing surface 100 of the gripper head 10, can be moved over the receptacle of a final package (not shown) into which the contact lens CL is to be deposited. During this movement of the gripper 1 to the receptacle, liquid is sucked off the entire time so that extremely little liquid, preferably none at all, is entrained with the contact lens CL or with the gripper 1 into the receptacle. A receptacle in which a contact lens CL can be deposited and which forms part of a final package is described for example in EPA-0 680 895 and has a receiving trough for the contact lens into which the contact lens is to be deposited with relatively precise positioning, so that the contact lens cannot be damaged when the receptacle is sealed with the aid of a cover foil.

To deposit the contact lens in the receiving trough of the receptacle, the gripper 1 is moved across the receiving trough of the receptacle. Overpressure is now applied via the overpressure channel, that is to say via the interior 120. In doing so, the underpressure can at the same time be maintained in the tube 13 so that, as a result of simultaneously applied overpressure and underpressure, any liquid possibly still present in the interior 120 near the openings is forced by the overpressure in the direction towards the tube 13 and is sucked off there by the prevailing underpressure. After a certain period of time has elapsed, the application of the underpressure can be ended so that only overpressure (e.g. blowing air) is applied. The overpressure applied through the openings 101 and 102 ensures that the contact lens CL lying on the bearing surface 100 of the gripper head 10 is released (blown off) from the bearing surface 100 of the gripper head 10 in a controlled and uniform manner, so that for example it is deposited in a controlled and precise manner into the receiving trough of the receptacle of the final package.

The above-described use of the gripper according to the invention for removing a contact lens from a test cell and subsequently depositing the contact lens in the receptacle of a final package is to be seen only as an example of one possible use of the gripper. The gripper can of course also be used at other stations of an automated production process for contact lenses, for example for removing contact lenses from the female mould half, or at stations at which the contact lens has to be transferred for other reasons.

What is claimed is:

1. A gripper for contact lenses, with a gripper head which has a bearing surface for a contact lens and in which one or more openings are provided, wherein said openings are adapted to apply an underpressure to suck the contact lens against the bearing surface via an underpressure channel leading to the openings in the gripper head and an overpressure channel leading to the openings in the gripper head to release the contact lens from the bearing surface, characterized in that grooves are provided in the gripper head, are essentially separate from one another and connect a plurality of openings to one another, wherein said gripper is adapted to be used in automated production.

2. The gripper according to claim 1, characterized in that the openings are arranged on an arc of a circle, and an opening is also arranged at the centre of the arc of the circle.

3. The gripper according to claim 2, characterized in that a separate groove is provided starting from the opening at the centre of the arc of the circle and extending to each opening arranged on the arc of the circle, said groove connecting the opening at the centre to the respective opening on the arc of the circle.

4. The gripper according to claim 3, characterized in that the respective groove, which connects the opening at the centre of the arc of the circle to the respective opening on the arc of the circle, extends radially outwards beyond the opening on the arc of the circle.

5. The gripper according to claim 1, characterized in that the grooves are provided in the bearing surface.

6. The gripper according to claim 1, characterized in that the outer surface of the gripper is smooth and has no depressions in which liquid can collect.

7. The gripper according to claim 8, characterized in that the underpressure channel is formed by a tube which extends through the interior of the gripper forming the overpressure channel, and which ends at a short distance from the openings in the gripper head.

8. The gripper according to claim 7, characterized in that the tube forming the underpressure channel ends at a distance (d) of 0.1 mm to 5 mm from the openings in the gripper head.

9. A device for gripping contact lenses comprising a gripper according to one of the preceding claims, a nozzle ring which on its inner wall is provided with nozzles through which a gaseous medium can be applied, said gripper and nozzle ring being designed such that the gripper can be moved through the nozzle ring towards a contact lens which is to be gripped and, after the contact lens has been gripped, can be moved back together with the contact lens through the nozzle ring again so that, as the gripper is moved back through the nozzle ring, the contact lens can be acted upon by the gaseous medium.

10. The gripping device of claim 9, wherein said gaseous medium further comprises air.

11. The gripper according to claim 7, characterized in that the tube forming the underpressure channel ends at a distance (d) of 0.1 mm.

* * * * *